Sept. 9, 1952 W. H. BURKHART ET AL 2,610,243

KEYBOARD OPERATED TRANSLATING CIRCUIT

Filed April 6, 1951

INVENTORS
WILLIAM H. BURKHART
HOWARD M. FLEMING, JR.
BY William S. Sloven
AGENT

Patented Sept. 9, 1952

2,610,243

UNITED STATES PATENT OFFICE 2,610,243

KEYBOARD OPERATED TRANSLATING CIRCUIT

William Henry Burkhart, East Orange, and Howard M. Fleming, Jr., Orange, N. J., assignors to Monroe Calculating Machine Company, Orange, N. J., a corporation of Delaware Application April 6, 1951, Serial No. 219,622

4 Claims. (Cl. 177—353)

This invention relates to electronic computers and more particularly to a keyboard operated translating circuit.

In known computing machines, digital amounts in the "coded decimal" or "1, 2, 4, 8" system of binary notation, are represented by differentially timed pulses transmitted over four feed lines. This arrangement, while satisfactory for some applications, is found lacking in others wherein it is desired that coded digital information be transmitted over a single feed line.

The principal object of the invention, therefore, is the provision of a keyboard operated translating circuit with which the plural line, differentially timed pulse representation of digital information is transformed into a timed pulse code for single line transmission.

According to the invention a plurality of input lines along which differentially timed pulses are transmitted in accordance with a first code, are selectively connected through rectifiers and digital keyboard keys with a single output line along which timed pulses are to be fed in accordance with a second code. The output line is normally at a low potential, but when a digit key is depressed, the timed pulses from the input line or lines associated with the key, momentarily raise the potential of the output line to effect the transmission of timed pulses thereon.

A further development of the invention also includes means for initiating the generation of a predetermined number of pulses in accordance with the first code at each operation of a keyboard key in order to limit the number of digit signals that are transmitted in the second code; and means for eliminating the undesirable effects of key chatter on the operation of the associated circuitry.

Other objects and features of the invention will become apparent from the following description when read in the light of the attached drawings of which:

Figure 1:
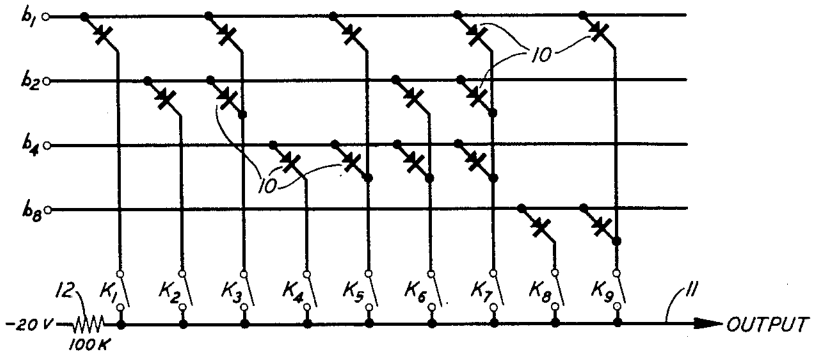
Fig. 1 is a circuit diagram illustrating the translator of the invention.
Figure 2:
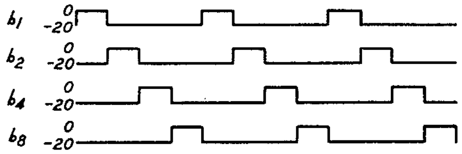
Fig. 2 is a diagram illustrating the arrangement of the input pulses for the circuit of Fig. 1.
Figures 4, 5, 6:
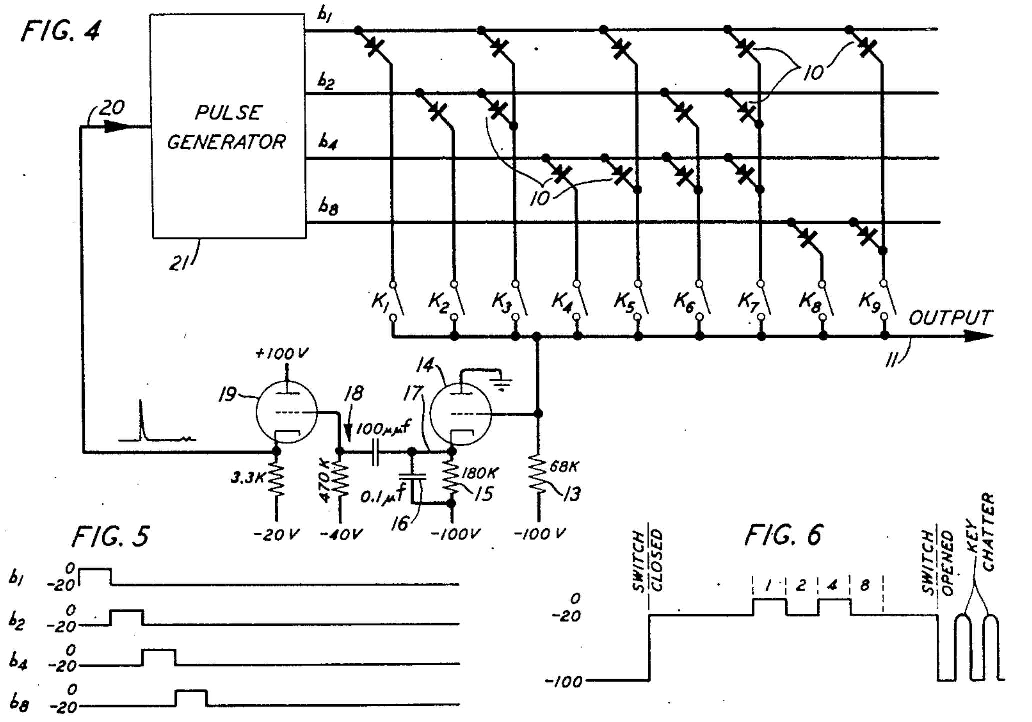
Fig. 4 is a circuit diagram illustrating the developed form of the invention.
Fig. 5 is a diagram illustrating the arrangement of the input pulses for the circuit of Fig. 4, and, Fig. 6 is a diagram illustrating the output of the circuit of Fig. 4 on the closure of the key switch for the digit five.

Referring to Fig. 1, the illustrated instance of the translator of the invention comprises four input lines *b1*, *b2*, *b4*, and *b8* over which differentially timed positive pulses are transmitted by any suitable means. Preferably, lines *b1*, *b2*, *b4* and *b8* are normally at a potential of −20 volts and are raised to 0 volts by said pulses. As shown in Fig. 2, the pulses are transmitted along lines *b1*, *b2*, *b4* and *b8* during successive time periods of which the first is allotted to line *b1*, the second to line *b2*, etc. The pulse succession may be reinitiated or recycled after every fourth time period as shown in Fig. 2 or may be recycled only after a predetermined larger number of time periods as indicated in Fig. 5. This latter arrangement will be more fully described hereinafter. In accordance with the well known "1, 2, 4, 8" system of binary notation, the pulses on lines *b1*, *b2*, *b4* and *b8* during each cycle of four time periods represent the digits 1, 2, 4, and 8.

The input lines *b1*, *b2*, *b4* and *b8* are connected through germanium crystal diodes 10 with keyboard digit switches *k1*—*k9*, each line being connected with those switches that are representative of digits associated with the pulses on the line. For example, line *b1* is connected with the "1" switch *k1*, and lines *b1*, *b2* and *b4* are connected with the "7" switch *k7*.

Switches *k1*—*k9* are connected with a common output line 11 to which a source of negative potential, say −20 volts is applied through a resistor 12 which may be of the magnitude of 100,000 ohms.

Figure 3:
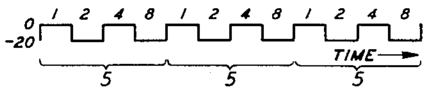
Fig. 3 is a diagram illustrating the output of the circuit of Fig. 1 on the closure of the key switch for the digit five.

The operation of the device is as follows:

Normally the switches *k1*—*k9* are open and the output line 11 is at the low potential of −20 volts. Closure of a key *k1*—*k9* connects the output line 11 with one or more of the input lines through the associated diodes 10, but no change in the potential of the output line is effected until the occurrence of the digital pulses on said line or lines. The said pulses cause the diodes to conduct and the potential of the output line is raised to approximately 0 volts due to current flow in resistor 12. It is readily apparent, therefore, that the input pulses effect the generation of output pulses of the same relative timing. For example, assuming that the "5" switch *k5* is closed and connects input lines *b1* and *b4* with the output line 11, the occurrence of a pulse on line *b1* during the first time period of a cycle effects the generation of an output pulse on line 11 during said first time period (Figs. 2 and 3), and the occurrence of a pulse on line *b4* during the third time period, effects the generation of a second pulse on line 11 during said third period. No input pulses occur on lines *b1* and *b4* during the second and fourth time periods and output line 11 is maintained at a low potential during these periods by resistor 12.

It will be seen, therefore, that operation of the switches *k1*—*k9* translates a four line code into a single line code by transferring the timed code pulses from input lines *b1*, *b2*, *b4* and *b8* onto output line 11 without disturbing their relative timing.

Referring now to Figs. 4, 5 and 6, the means of the invention may operate in the described manner to emit a non-repeated digital signal under control of a single train of timed input pulses; or a specific predetermined number of pulses may be emitted under control of a like number of trains of input pulses. Thus the closure of any switch *k1*—*k9* transmits over output line 11 only a predetermined number of sets of pulses representative of the digit associated with the switch, regardless of the length of time that the switch is maintained closed. This arrangement is extremely useful in computer input systems. Any desired means may be provided for effecting the transmission of a desired number of pulses over each input line *b1*, *b2*, *b4* and *b8* for each closure of a switch *k1*—*k9*, but the arrangement shown in Fig. 4 is a preferred one which serves also to eliminate the undesirable effects of switch or key chatter.

Referring to Fig. 4 the output line 11 is connected through a resistor 13 which may be of the magnitude of 68,000 ohms, with a —100 volt source. Normally, therefore, output line 11 is at the low potential of —100 volts as indicated in Fig. 6. Line 11 is also wired to the grid of a cathode follower connected tube 14, whose cathode is connected through a resistor 15 to the —100 volt source. A condenser 16 is connected across resistor 15 and the two are so proportioned as to provide a relatively slow time constant. Thus, the potential of output line 17 from said cathode is slow in following negative excursions of the grid of the tube. Values of 180,000 ohms and .1 microfarad have been found acceptable for resistor 15 and condenser 16 respectively. Output line 17 feeds into a differentiating network 18 which may be of any ordinary configuration which produces sharp positive pulses proportional in magnitude to the positive excursions of output line 17 of the cathode follower. These sharp pulses control a second cathode follower 19. Preferably, the grid of tube 19 is biased 20 volts below its cathode so that potential rises of the grid must exceed 20 volts in order to produce an appreciable pulse on output line 20 of the tube.

The operation of the circuit is as follows.

Normally, digit output line 11 and, therefore, the output line 17 of the cathode follower 14 are at a potential of —100 volts. Closure of a switch *k1*—*k9*, however, connects said line 11 with one or more of the input lines *b1*, *b2*, *b4* and *b8* which are at a potential of —20 volts, and the potential thereof and of the grid of cathode follower 14 is raised to —20 volts. Through cathode follower action, this 80 volt rise is reflected on output line 17 and a sharp pulse is produced on line 20 by differentiator 18 and cathode follower 19. This pulse on line 20 is fed into, and initiates an operation of a pulse generator 21 which, in the present instance, is adapted to produce, on each initiation thereof, four successive pulses for transmission over lines *b1*, *b2*, *b4* and *b8* in the proper sequence. When it is desired to transmit more than one pulse over each input line *b1*, *b2*, *b4* and *b8*, the generator is arranged to do so under control of a single initiating pulse. Generator 21 may be of any suitable kind but preferably includes an initiator tube which is biased beyond cutoff by an amount which can be overcome only by a large pulse on line 20, that is, one proportional to the 80 volt rise on line 17. The reason for this will become apparent hereinafter.

The four pulses emitted by generator 21, in the present instance, serve in the same manner as described above to raise the digit output line 11 to 0 volt potential and thus to display on said line the pulse representation of the digit associated with the closed switch *k1*—*k9*. The rise in potential of output line 11 from —20 volts to 0 volts due to the occurrence of a pulse on the appropriate line *b1*, *b2*, *b4* and *b8* effects, through cathode follower action, a similar rise in the potential of output line 17 of the cathode follower. Due to the rise of line 17, the differentiator 18 produces another sharp pulse, which, however, has a maximum magnitude of only 20 volts which is not sufficient to cause cathode follower 19 to proluce an appreciable pulse on output line 20. Immediately following an effective pulse on one of the lines *b1*, *b2*, *b4* or *b8*, the digit output line 11 drops to a potential of —20 volts and the output line 17 of cathode follower 14 attempts to follow it. However, the time constant provided by resistor 15 and condenser 16 slows up the rate of potential drop of line 17 so that an appreciable time elapses before line 17 does reach the —20 volt level. If line 11 is again raised to 0 volt potential by a second pulse, as, for example, when the "5" switch *k5* is closed the just above described action is repeated and a second ineffective pulse is produced on line 17.

When a closed switch *k1*—*k9* is opened, some chattering occurs, and contact is made and broken one or more times before being broken cleanly. This chattering effects a momentary fluctuation of the potential of digit output line 11 between —20 volts and —100 volts, that is, the closed and open switch conditions. These fluctuations are reflected on the grid of tube 14, but the time constant of resistor 15 and condenser 16 prevents the immediate lowering of the potential of line 17 to —100 volts so that the upward fluctuations thereof to —20 volts are of small magnitude and only small ineffective pulses, if any, are produced on line 20 by differentiator 18 and cathode follower 19. When the switch chatter terminates and the potential of line 11 comes to rest at —100 volts, the potential of line 17 follows under control of its time constant. It is believed apparent that if the potential of line 17 were allowed to fall to a potential of —100 volts immediately after a switch *k1*—*k9* is closed, the fluctuations thereof due to switch chatter would allow differentiator 18 to produce pulses of sufficient magnitude to trigger generator 21 again. This, of course, would result in a misoperation of the device.

It is to be mentioned that in choosing the values of resistor 15 and condenser 16, a compromise is made between a slow time constant and high keying speed, that is, the time required between the opening of one switch *k1*—*k9* and the closure of another for line 17 to reach a potential that is sufficiently negative to assure an operation of generator 21 as a result of said closure. Further, it is to be understood that the potential levels of 0, −20 and −100 volts, and the disclosed values of the several circuit components are only by way of example and that any other suitable values may be substituted therefor without departing from the spirit of the invention. Also, whereas the invention has been applied to the translation of a four line code into a single line code, it is equally well adapted for the translation of any plural line code into a single line code.

While there has been described what is considered to be a highly desirable embodiment of the invention, it is obvious that many changes in form could be made without departing from the spirit of the invention, and no limitation is made to the exact form herein shown and described, nor to anything less than the whole of the invention as hereinbefore set forth, and as hereinafter claimed.

I claim:

1. A translating circuit comprising an output line, a resistor connecting said line with a source of potential, a plurality of input lines at a much higher potential than said output line, a series of diodes inserted between said input lines and said output line and made conducting by said difference in potential, a series of keyboard switches, one for each signal to be transmitted and each connected in series with one or more of said diodes between said output line and one or more of said input lines, a cathode follower having its grid connected to said output line, a differentiating network fed by said cathode follower, and a pulse generator adapted to produce a predetermined number of pulses for transmittal over said input lines, tripped by a pulse from the differentiator.

2. A translating circuit comprising an output line, a resistor connecting said line with a source of potential, a plurality of input lines at a much higher potential than said output line, a series of diodes inserted between said input lines and said output line and made conducting by said difference in potential, a series of keyboard switches, one for each signal to be transmitted and each connected in series with one or more of said diodes between said output line and one or more of said input lines, closure of a said switch raising the output line to the much higher potential of the input lines, a cathode follower having its grid connected to said output line, a differentiating network fed by said cathode follower and emitting a large pulse on closure of a said switch, and a pulse generator adapted to produce a predetermined number of pulses for transmittal over said input lines, tripped by said large pulse from the differentiator, one or more of said input line pulses raising the potential of the output line a smaller amount to provide output pulses, and said smaller amount also producing a differentiator output pulse of insufficient magnitude to trigger said generator.

3. A translating circuit comprising an output line, a resistor connecting said line with a source of potential, a plurality of input lines at a much higher potential than said output line, a series of diodes inserted between said input lines and said output line and made conducting by said difference in potential, a series of keyboard switches, one for each signal to be transmitted and each connected in series with one or more of said diodes between said output line and one or more of said input lines, closure of a said switch raising the output line to the much higher potential of the input lines, a cathode follower having its grid connected to said output line, a differentiating network fed by said cathode follower and emitting a large pulse on closure of a said switch, a pulse generator adapted to produce a predetermined number of pulses for transmittal over said input lines, tripped by said large pulse from the differentiator, one or more of said input line pulses raising the potential of the output line a smaller amount to provide output pulses and said smaller potential rise also producing a differentiator output pulse of insufficient magnitude to trigger said generator, and an RC network between said cathode follower and said differentiator to slow the negative swing of the differentiator input when a said switch is opened and thus prevent large positive swings thereof due to make and break switch chatter.

4. A translating circuit comprising an output line, a resistor connecting said line with a source of potential, a plurality of input lines at a much higher potential than said output line, a series of diodes inserted between said input lines and said output line and made conducting by said difference in potential, a series of keyboard switches, one for each signal to be transmitted and each connected in series with one or more of said diodes between said output line and one or more of said input lines, closure of a said switch raising the output line to the much higher potential of the input lines, a cathode follower having its grid connected to said output line, a differentiating network fed by said cathode follower and emitting a large pulse on closure of a said switch, a pulse generator adapted to produce a predetermined number of pulses for transmittal over said input lines, tripped by said large pulse from the differentiator, one or more of said input line pulses rasiing the potential of the output line a smaller amount to provide output pulses and said smaller potential rise also producing a differentiator output pulse of insufficient magnitude to trigger said generator, and an RC network associated with the cathode of said follower to slow the negative swing of said cathode when a said switch is opened and prevent large positive swings thereof due to make and break switch chatter.

WILLIAM HENRY BURKHART.
HOWARD M. FLEMING, Jr.

REFERENCES CITED

The following references are of record in the file of this patent:

UNITED STATES PATENTS

| Number | Name | Date |
|---|---|---|
| 2,563,589 | Den Hertog | Aug. 7, 1951 |

FOREIGN PATENTS

| Number | Country | Date |
|---|---|---|
| 499,900 | Great Britain | Jan. 31, 1939 |

OTHER REFERENCES

Proceedings of the IRE, February 1949, pages 139–147, pages 143–144 in particular (Rectifier Networks for Multiposition Switching by Brown and Rochester).